(12) United States Patent
Moffa et al.

(10) Patent No.: US 7,438,354 B2
(45) Date of Patent: Oct. 21, 2008

(54) INTEGRATED SEATBELT IN A CANTILEVERED STOWABLE SEAT WITH AN IMPROVED DUMP LOCKING MECHANISM

(75) Inventors: Michael D. Moffa, Morton, IL (US); Daniel L. Cohen, Evanston, IL (US); Benjamin N. Huyck, Skokie, IL (US); Anthony W. Purnell, Chicago, IL (US); Sudha Veerapaneni, Chicago, IL (US)

(73) Assignee: Freedman Seating Company, Chicago, IL (US)

( * ) Notice: Subject to any disclaimer, the term of this patent is extended or adjusted under 35 U.S.C. 154(b) by 157 days.

(21) Appl. No.: 11/082,411

(22) Filed: Mar. 17, 2005
(Under 37 CFR 1.47)

(65) Prior Publication Data

US 2006/0208546 A1    Sep. 21, 2006

(51) Int. Cl.
*B60N 2/32* (2006.01)
*B60N 2/14* (2006.01)
*A47C 9/06* (2006.01)

(52) U.S. Cl. .................... 297/14; 297/378.12; 297/335; 297/331; 297/452.39

(58) Field of Classification Search .................... 297/14, 297/452.39, 378.12, 331, 334, 335
See application file for complete search history.

(56) References Cited

U.S. PATENT DOCUMENTS

| 543,487 A * | 7/1895 | Kilgore .................... 297/307 |
| 5,015,010 A | 5/1991 | Homeier |
| 5,393,123 A | 2/1995 | Hernandez |
| 5,489,141 A * | 2/1996 | Strausbaugh et al. ........ 297/335 |
| 5,492,389 A | 2/1996 | McClintock |
| 5,577,805 A * | 11/1996 | Glinter et al. .......... 297/378.12 |
| 5,722,731 A * | 3/1998 | Chang ........................ 297/473 |
| 5,795,024 A * | 8/1998 | Collins et al. ............ 297/361.1 |
| 5,868,452 A * | 2/1999 | Grieger ..................... 296/68.1 |
| 5,984,397 A * | 11/1999 | Dawson et al. ........... 296/65.09 |
| 6,048,034 A | 4/2000 | Aumont |
| 6,106,066 A * | 8/2000 | Moffa et al. ................ 297/332 |
| 6,161,899 A | 12/2000 | Yu |
| 6,290,297 B1 | 9/2001 | Yu |
| 6,409,263 B1 | 6/2002 | Seibold |
| 6,460,922 B1 | 10/2002 | Demick |
| 6,550,864 B1 | 4/2003 | Zarna et al. |
| 6,655,745 B2 | 12/2003 | Fohrenkamm |
| 6,786,543 B2 | 9/2004 | Anderson |
| 2005/0046220 A1* | 3/2005 | Hernandez et al. ....... 296/65.13 |
| 2005/0269842 A1* | 12/2005 | Braun ......................... 297/14 |

* cited by examiner

*Primary Examiner*—David R Dunn
*Assistant Examiner*—Tania Abraham

(57) ABSTRACT

A three point integrated seatbelt assembly incorporated into a cantilevered stowable seat with an improved dump locking mechanism. The cantilevered stowable seat can be mounted to a vehicle, where space may be selectively provided for positioning a wheelchair or other article adjacent to the stowed seat, which includes a frame attached to the support member, a cantilevered seatbase, and a seatback. The seatback assembly allows for easy storage of the seat and safe transportation of a passenger. The seatback is rotatably associated with the cantilevered seatbase by the improved dump locking mechanism, whereby the improved dump locking mechanism enables the seat to remain in the deployed position when inertial forces are placed on the seatback.

1 Claim, 8 Drawing Sheets

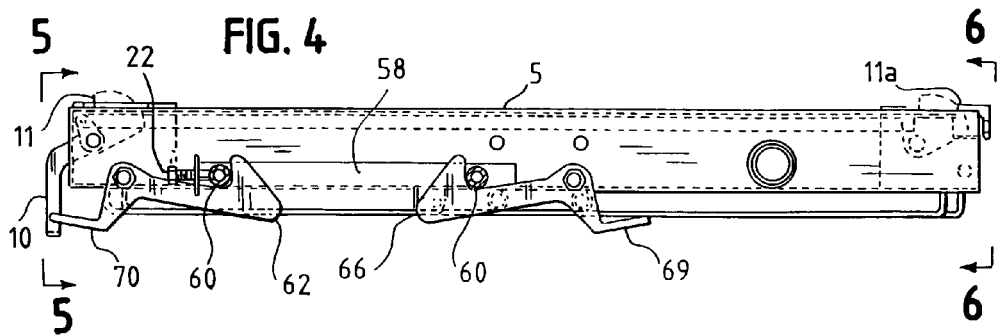
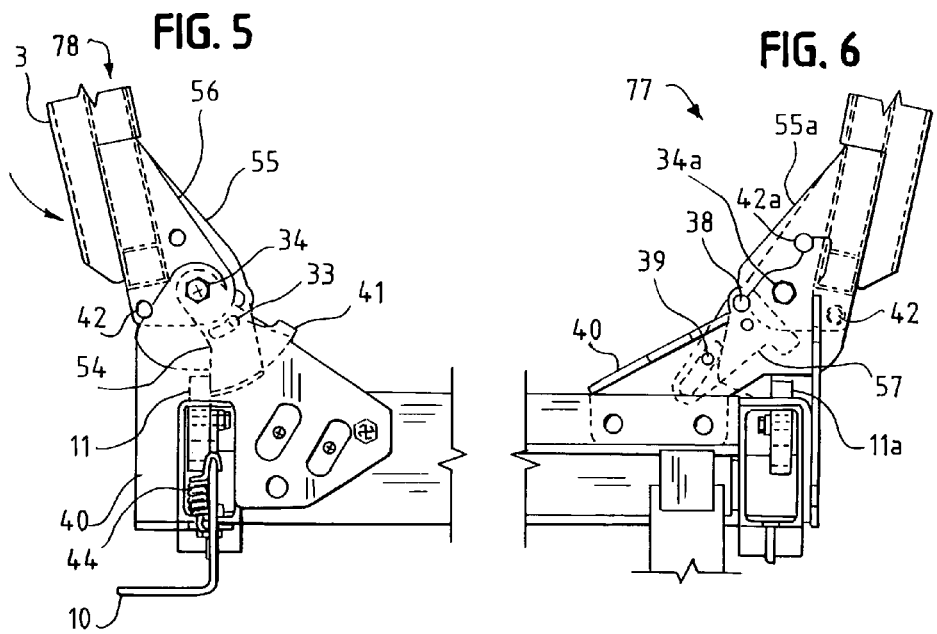
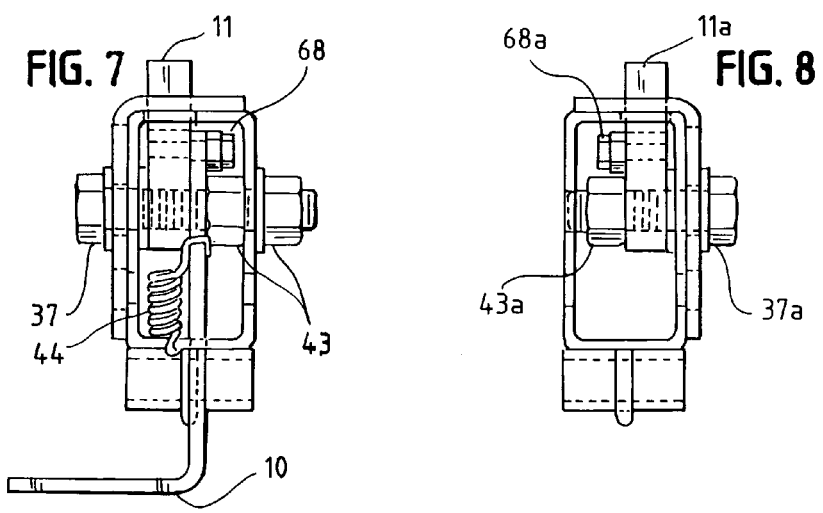

INTEGRATED SEATBELT IN A CANTILEVERED STOWABLE SEAT WITH AN IMPROVED DUMP LOCKING MECHANISM

BACKGROUND OF THE INVENTION

This invention generally relates to at least one cantilevered stowable seat, and more particularly, pertains to the integration of a seatbelt assembly with a cantilevered stowable seat. The stowable seat cooperates with an improved dump locking mechanism which provides a convenient, unhindered storage area for articles and space for passengers when in the stowed position. Further, the integrated seatbelt assembly and cantilevered seatbase conveniently and firmly secures passengers into the cantilevered seatbase in cooperation with the improved dump locking mechanism that can be easily released from different positions.

The improved dump locking mechanism that cooperates with the cantilevered seatbase and seatback prevents forward and rearward movement of the seatback while also enabling the seat to be placed in a stowed position. The stowable seat can move to the stowed position with ease due to the integration of the seatbelt assembly and the dump mechanism provides the necessary rigidity to maintain the integrity of the seatback when inertial forces are present.

Typically, a cantilevered stowable seat is deployed in the industry by having a single leg and frame while the aisle end is legless and is supported by a diagonal support member that is slidable. Formerly, for at least 10 years, a lap type 1 seat belt restraint was used as a seat belt. However, in type 2 seatbelts where there is both a lap restraint and an upper torso restraint system, the slidable diagonal support member is insufficient to sustain forward and rearward forces of a passenger secured by an integrated seatbelt that is not fastened directly to the frame of the vehicle. As such, a stowable seat with an integrated seatbelt that does not rely on the vehicle frame must be designed to stabilize the stowable seat during extreme forces where the forward forces are caused by belt loading and the rearward forces are caused by the weight of the passenger. Belt loading occurs when the occupant engages the restraint system which in turn acts on the seatback and cantilevered seatbase.

Prior art dump locking mechanisms are complex, heavy, and expensive with locking gears and latches. These dump locking mechanisms, when used in a stowable seat system, would make it difficult to move a stowable seat between stowed and deployed positions. Further, the prior art has included locking mechanisms for stowable seats without integrated seatbelts. These locking mechanisms are insufficient to support the inertial forces present when a passenger is seated in a stowable seat and secured by an integrated seatbelt assembly.

While there has been a long existing need for stowable seats with integrated seatbelts, up until now the prior art has not solved the problem of inertial impact on the stowable seats where the aisle end of the seats does not have legs. It is important not only for the seat to carry a larger inertial load during frequent stops or accidents, but also to maintain flexibility and the capability to move to a stowed position. Furthermore, a need exists in the relevant art to provide a dump locking mechanism to maximize the structural integrity of the stowable seat and integrated seatbelt system while minimizing the overall cost of the system. Accordingly, this invention solves the problem of the forward and rearward impact of the seats when the seatbelt restraint system that has a type 1 and type 2 belt is associated with the frame of the (see CFR 49 for definitions of "type 1" and "type 2" restraint systems) stowable seatback rather than the frame of the vehicle.

SUMMARY OF INVENTION

Accordingly, it is an object of the present invention to provide a cantilevered stowable seat with an integrated seatbelt assembly and an improved dump locking mechanism to stabilize the stowable seat when the seatbelt assembly is employed. The dump locking mechanism further enables the seatback to be moved to and from the folded position. The cantilevered seatbase with the folded seatback can then rotate to the stowed position and storage space is created for a wheelchair or article adjacent to the stowable seat. The stowable seat includes a seatback, a cantilevered seatbase, a seat frame, a diagonal truss, a seatbelt assembly, a downlock mechanism, an uplock mechanism, and an improved dump locking mechanism. The improved dump locking mechanism enables the seatback to be placed in the unfolded position to provide seating for passengers. Once a passenger is secured into the stowable seat by the integrated seatbelt assembly, the seat is stabilized by the improved dump locking mechanism.

The preferred embodiment of the invention includes an improved dump locking mechanism comprising an aisle side dump locking mechanism, a metal connecting rod, and a window side dump locking mechanism. The swing plate is pivotally associated with the bracket plate and the swing plate is designed to engage between the metal stop protrusion and the locking plate to support the seatback in the unfolded position. The seatback side plate is pivotally associated with the bracket plate and the seatback plate is designed to engage the locking plate to further define and maintain the seatback in the unfolded position. The seatback stop plate is pivotally associated with the bracket plate and the seatback stop plate maintains a seatback stop pin. The bracket plate is designed to engage the seatback stop pin to define the seatback in the unfolded position.

The release handle is pivotally associated with the locking plates on both the window and aisle sides of the seat by a metal connecting rod. The release handle disengages the locking plates from the seatback plates, the swing plate, and the fasten plate to enable the folding of the seatback into the folded position. A biasing spring operable on the release handle urges the release handle to force the locking plates back to the locked position. Once the seatback is in the folded position, the swing plate and fasten plate are designed to engage the locking plates in order to hold the seatback in the folded position.

Once the seatback is in the folded position, the stowable seat can be moved to the stowed position. The cantilevered seatbase is freely and pivotally mounted on an axis that is associated with the seat frame. The cantilevered seatbase cooperates with a diagonal truss supporting the seat to move into the stowed position. A locking mechanism assembly locks the cantilevered seatbase in the stowed position to permit storage of a wheelchair adjacent to the stowed seat.

BRIEF DESCRIPTION OF THE DRAWINGS

The present invention will become more fully understood from a detailed description and accompanying drawings, wherein:

FIG. 4 is a front sectional view of the cantilevered seatbase illustrating the connection between the metal rods, the cantilevered seatbase locking plates, and the release handles. It also illustrates the uplock and downlock mechanism that includes a slide member and release handle;

FIG. 5 is a side view of the aisle side dump locking mechanism. This illustrates how the aisle side of the seatback is maintained in a substantially unfolded position as referred to by the arrows 5 in FIG. 2;

FIG. 6 is a side view of the window side dump locking mechanism illustrating how the window side of the seatback is maintained in a substantially unfolded position as referred to by arrows 6 in FIG. 2;

FIG. 7 is a side view of the release handle illustrating how the locking plate on the aisle side and the connecting metal rod are pivotally associated with the release handle;

FIG. 8 is a side view of the window side locking plate illustrating how the locking plate on the window side is pivotally associated with the connecting metal rod;

DETAILED DESCRIPTION OF THE PREFERRED EMBODIMENTS

Figure 1:
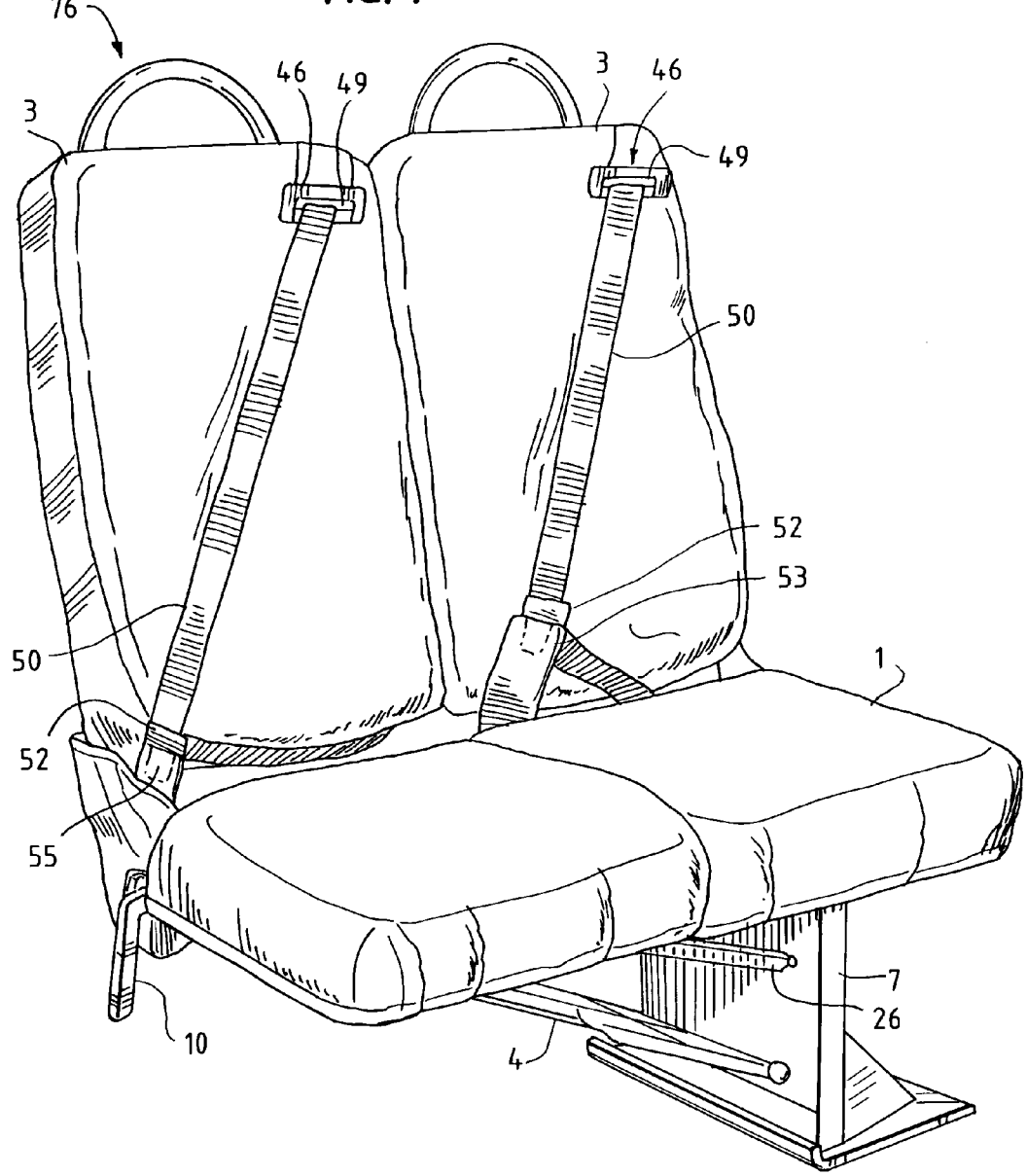
FIG. 1 is a pictorial view of the stowable seat illustrating the cantilevered seatbase in the deployed position, the seatback in the unfolded position, the seat frame supported by a leg frame and a diagonal truss, and the integrated seatbelt assembly.
Figure 2:
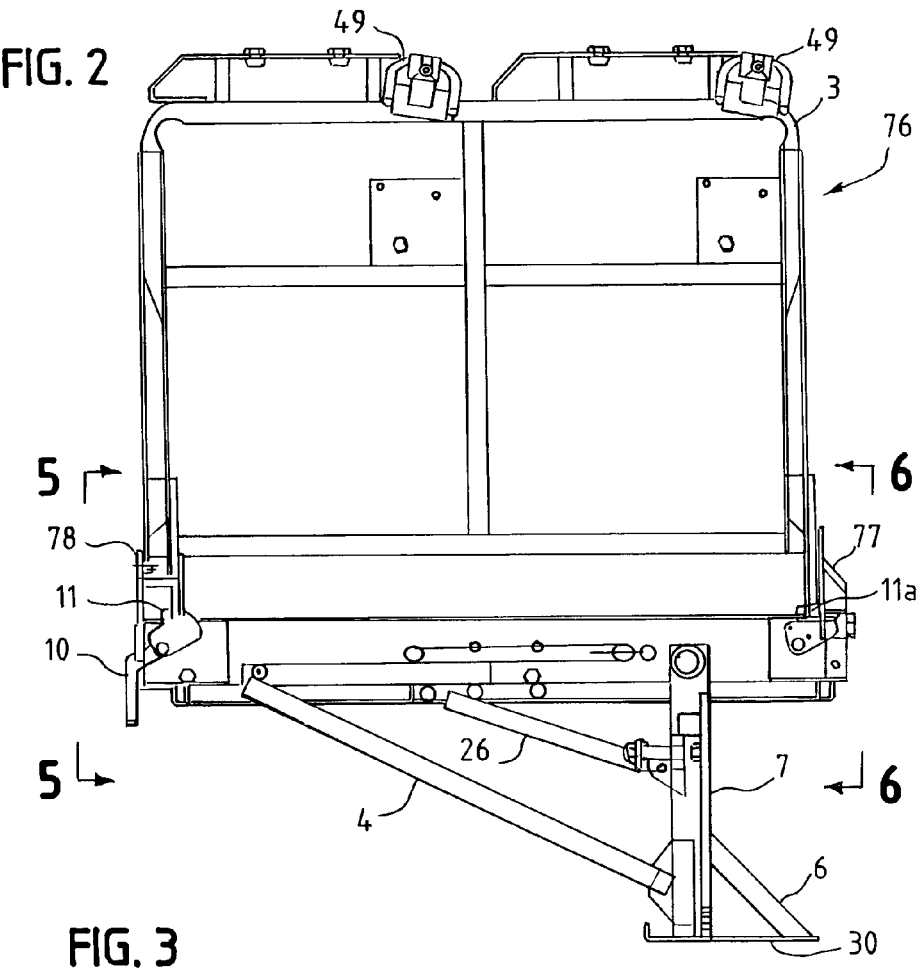
FIG. 2 is a rear view of the deployed seat illustrating the seatback in the unfolded position, the cantilevered seatbase in the deployed position, the gas-charged cylinder, the diagonal truss, and the seat frame supported by a leg frame mounted to the vehicle.

Referring to the drawings, there is shown cantilevered stowable seat 76 with integrated seatbelt assembly 46 that has particular utility for public and private transportation. As illustrated in FIGS. 1 and 2, cantilevered stowable seat 76 includes leg frame 7, cantilevered seatbase 1, seatback 3, seatbelt assembly 46, and diagonal truss 4.

In operation, cantilevered stowable seat 76 is positioned with cantilevered seatbase 1 in a deployed position and seatback 3 in an unfolded position. Passengers employ the integrated seatbelt system to secure themselves with shoulder and lap portions of seatbelt webbing 50. Cantilevered seatbase 1 is supported by leg frame 7 and diagonal truss 4. Cantilevered seatbase 1 and seatback 3 rotate to the stowed position after seatback 3 has been folded over to a position flat against cantilevered seatbase 1 to provide space for a wheel chair or other article. The positioning of integrated seatbelt assembly 46 enables cantilevered stowable seat 76 to rotate to the stowed position without interference from overhead belts attached to the vehicle frame that are typically found in passenger vehicles. Diagonal truss 4 may be locked into position to hold cantilevered stowable seat 76 in the stowed position.

Leg frame 7 and floor mount legs 6 fixedly attach to frame plate 30, thus securing cantilevered stowable seat 76 to the floor of a vehicle. Frame plate 30 is preferably constructed of steel having bolt holes for mounting or other similar means.

As seen in FIG. 2, cantilevered seatbase 1 is generally rectangular having a cover and removably attached to leg frame 7. Gas charged cylinder 26 is removably attached to cantilevered seatbase 1 to provide a lifting force while rotating the seat to the stowed position. In FIG. 2, gas charged cylinder 26 is connected to inner frame of cantilevered seatbase 1 and leg frame 7. Diagonal truss 4 is generally rectangular and, in cooperation with frame plate 30, supports cantilevered seatbase 1 in the deployed position.

FIG. 5 illustrates aisle side dump locking mechanism 78 which includes bracket plate 40 removeably attached to outer frame of cantilevered seatbase 1. Bracket plate 40 may be mounted in position by bolts, welding, or other similar fastening methods. Seatback side plate 55 is fixedly attached to the inner frame of seatback 3. Seatback stop plate 56 is fixedly attached to seatback 3. Seatback side plate 55 and seatback stop plate 56 may be mounted in position by welding or other similar fastening methods. Seatback side plate 55 and seatback stop plate 56 are pivotally associated with bracket plate 40 by pivot pin 34 in order to pivotally mount seatback 3 on cantilevered seatbase 1.

Figure 9:
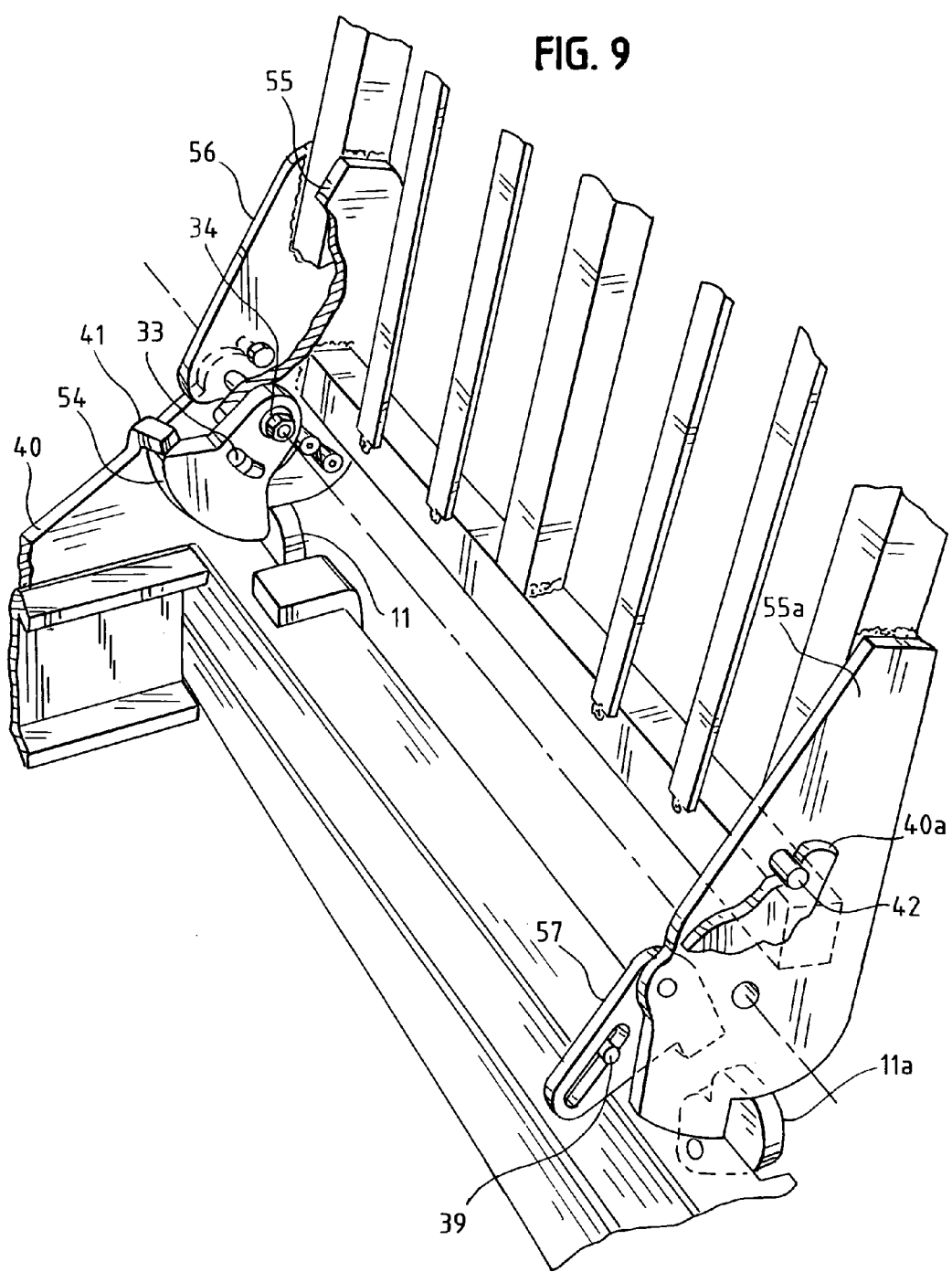
FIG. 9 is a perspective cutaway view from the window side of both the aisle and window side dump mechanisms. This figure illustrates the positioning of the swing plate and the fasten plate when in the deployed position. Also shown is the swing plate engaging both the metal stop protrusion and the locking plate.
Figure 10:
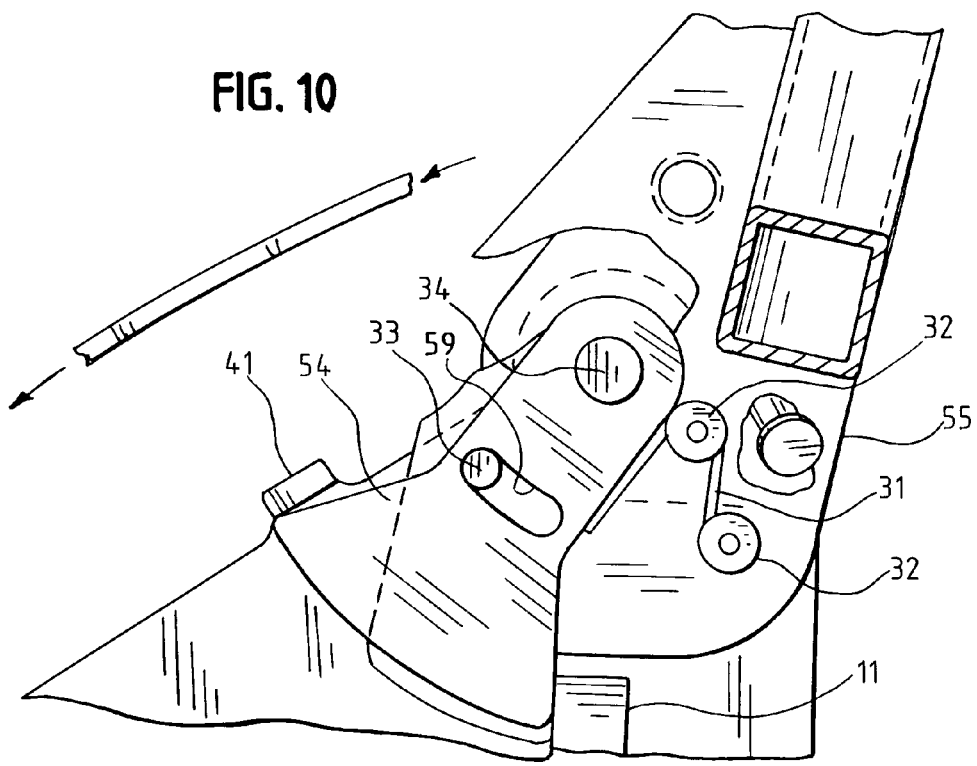
FIG. 10 is a side view of the aisle side dump locking mechanism illustrating the positioning of the swing plate when the stowable cantilevered seat is in a substantially unfolded position.
Figure 11:
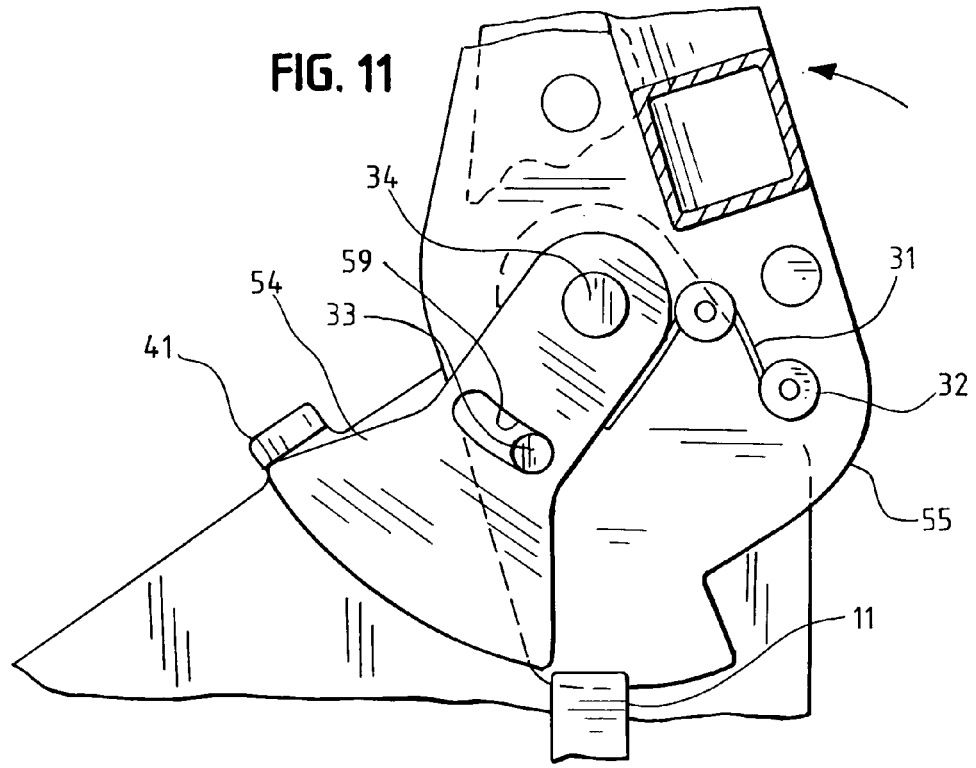
FIG. 11 is a side view of the aisle side dump locking mechanism illustrating the positioning of the swing plate when the spring biased release handle is pulled to disengage the locking plate.

As illustrated in FIG. 9, bracket plate 40 includes metal stop protrusion 41. Swing plate 54 is pivotally mounted to bracket plate 40 with pivot pin 34 and is removably associated to the inner side of seatback side plate 55 with bolt 33. Seatback plate 55 includes cylindrical studs 32 where leaf spring 31 is secured to reinforce and maintain the position of swing plate 54. Swing plate 54 maintains an end point to engage metal stop protrusion 41 when seatback 3 is in the unfolded position preventing seatback 3 from tilting further rearwards. Seatback stop pin 42 may be securely mounted to seatback stop plate 56 by welding or similar mounting methods. Bracket plate 40 is designed to engage seatback stop pin 42 in order to further prevent rearward movement of seatback 3. Seatback plate 55 is mounted to the inner side of seatback 3 and is pivotally associated with bracket plate 40. As in FIGS. 6 and 7, seatback plate 55 is designed to engage locking plate 11 in order to prevent seatback 3 from tilting forward when the passenger is secured by seatbelt assembly 46. Locking plate 11 is pivotally mounted to cantilevered seatbase 1 by pivot pin 37.

Figure 14:
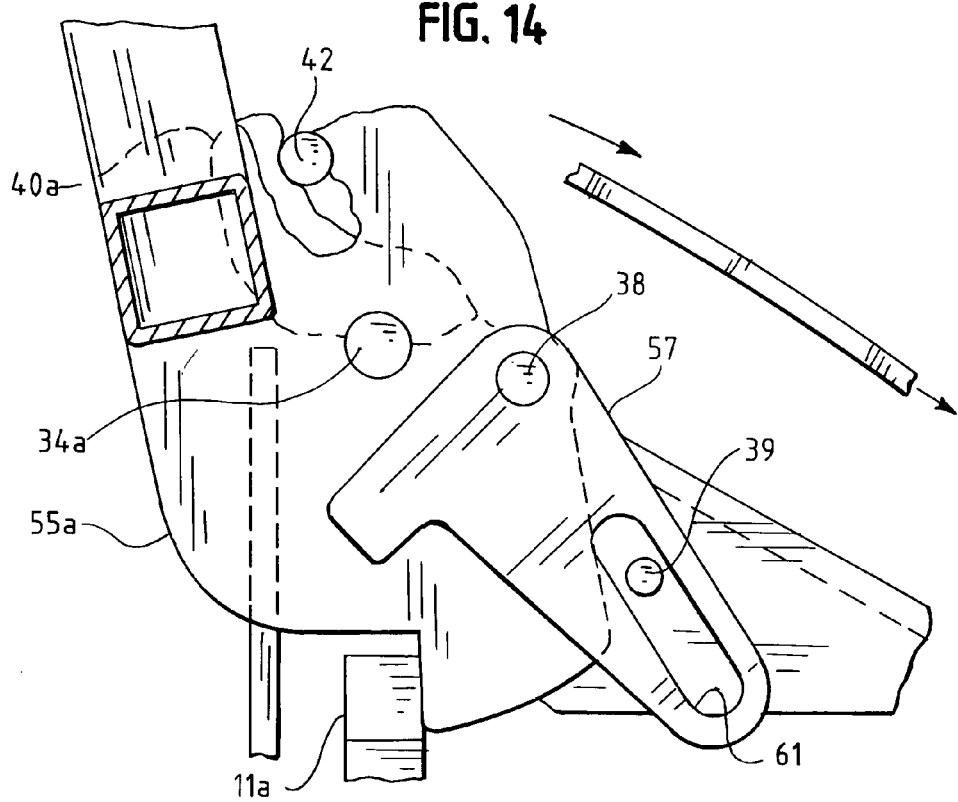
FIG. 14 is a side view of the window side dump mechanism illustrating the positioning of the fasten plate when the stowable cantilevered seat is in a substantially unfolded position.
Figure 15:
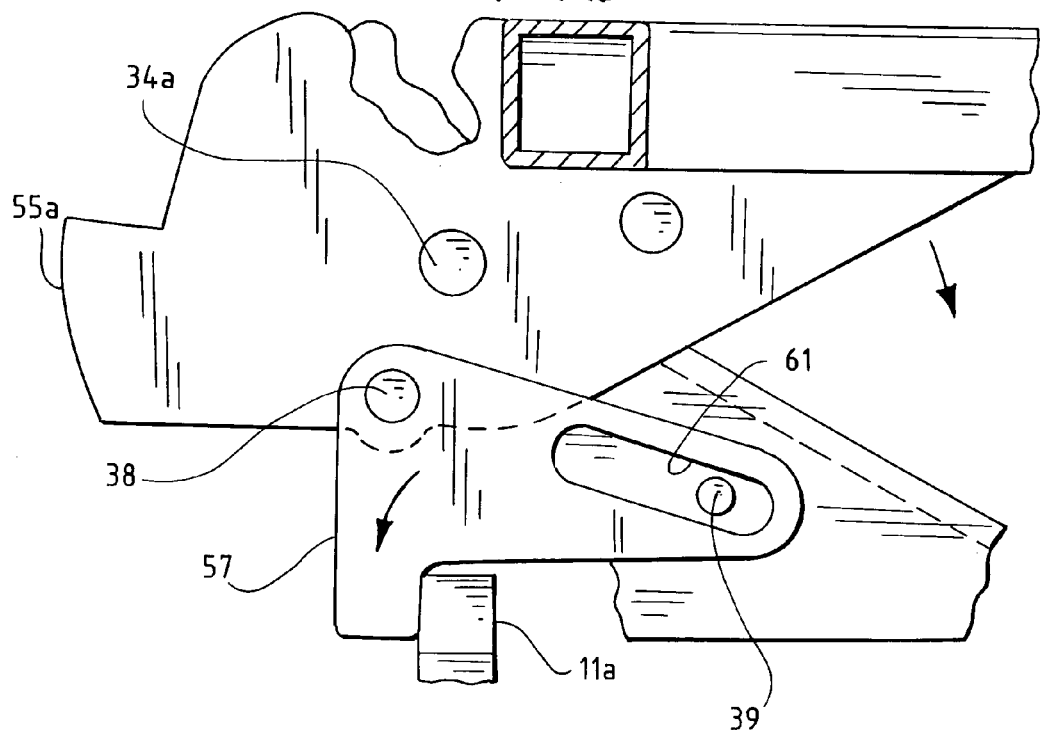
FIG. 15 is a side view of the window side dump mechanism illustrating the positioning of the fasten plate with relation to the locking plate after the spring biased release handle is pulled and the stowable cantilevered seat is in a substantially folded position.

In FIG. 6, window side dump locking mechanism 77 comprises seatback plate 55a fixedly attached to the inner frame of seatback 3 and bracket plate 40a which is removably associated with cantilevered seatbase 1. Seatback plate 55a pivotally associates with bracket plate 40a at pivot pin 34a to pivotally mount seatback 3 with cantilevered seatbase 1. Seatback stop pin 42a extends from seatback plate 55a. Bracket plate 40a is designed to engage seatback stop pin 42a when seatback 3 is in the unfolded position to further restrain seatback 3 from rearward movement. As in FIG. 8, locking plate 11a is pivotally mounted to cantilevered seatbase 1 by pivot pin 37a. Seatback plate 55a maintains an engagement surface to abut locking plate 11a, which restrains seatback 3 from forward motion when a passenger is secured by seatbelt assembly 46. Fasten plate 57 is pivotally associated to seatback plate 55 with pivot pin 39. As illustrated in FIGS. 14 and 15, fasten plate 57 is slidably associated with bracket plate 40 by bolt 39 which slides along track 61 in fasten plate 57. Fasten plate 57 is designed to move into engagement with window side locking plate 11a when seatback 3 is in the unfolded position in order to restrain seatback 3 from moving.

Figure 12:
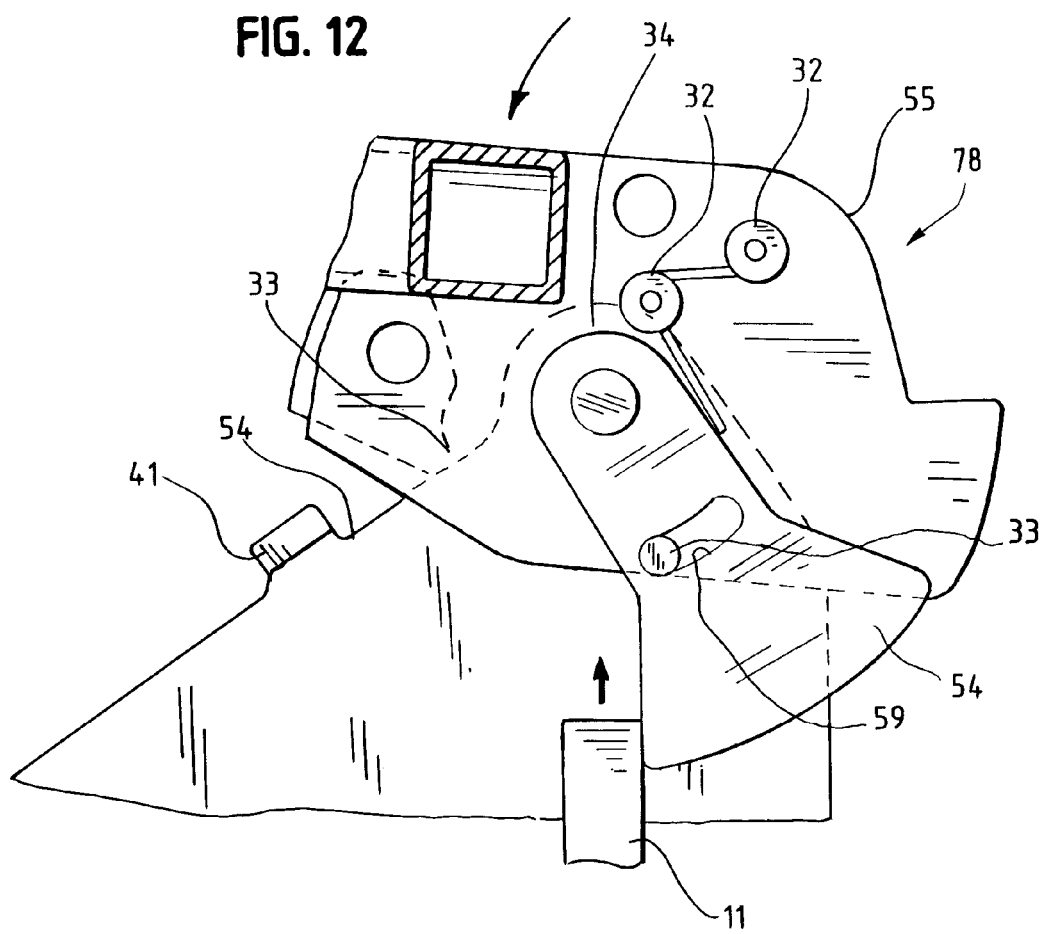
FIG. 12 is a side view of the aisle side dump locking mechanism illustrating the positioning of the swing plate when the seatback is in a substantially folded position and the locking plate is engaged.

As seen in FIGS. 5 and 7, locking plate 11 and spring biased release handle 10 are pivotally attached to seatbase 1 via pivot pin 37. Spring biased release handle 10 and metal rod 5 are pivotally mounted to locking plate 11 with pivot pin 68. FIG. 4 illustrates how metal rod 5 extends from locking plate 11 to locking plate 11a and is pivotally mounted to locking plate 11a by pivot pin 68a. Spring 44 is associated with spring biased release handle 10 while in the locked position as shown in FIGS. 5 and 7. Spring 44 biases locking plates 11 and 11a into the locked position to engage with seatback plates 55 via metal rod 5 to hold seatback 3 in the unfolded position An operator can pull spring biased release handle 10 to release seatback 3 to rotate to the folded position. When an operator pulls spring biased release handle 10, locking plates 11 and 11a simultaneously pivot downward into cantilevered seatbase 1, disengaging seatback side plates 55 & 55a and swing plate 54; and consequently, enabling seatback 3 to rotate to the folded position. FIG. 12 illustrates the positioning of aisle side dump mechanism 78 when seatback 3 is in the substantially folded position. Swing plate 54 has slidable track 59 and is removably attached to seatback plate 55 via bolt 34. Once locking plate 11 disengages swing plate 54 and seatback 3 begins to dump, swing plate 54 maintains engagement with metal stop protrusion 41 biased by leaf spring 31. Leaf spring 31 is attached to seatback plate 55 with cylindrical studs 32.

Figure 13:
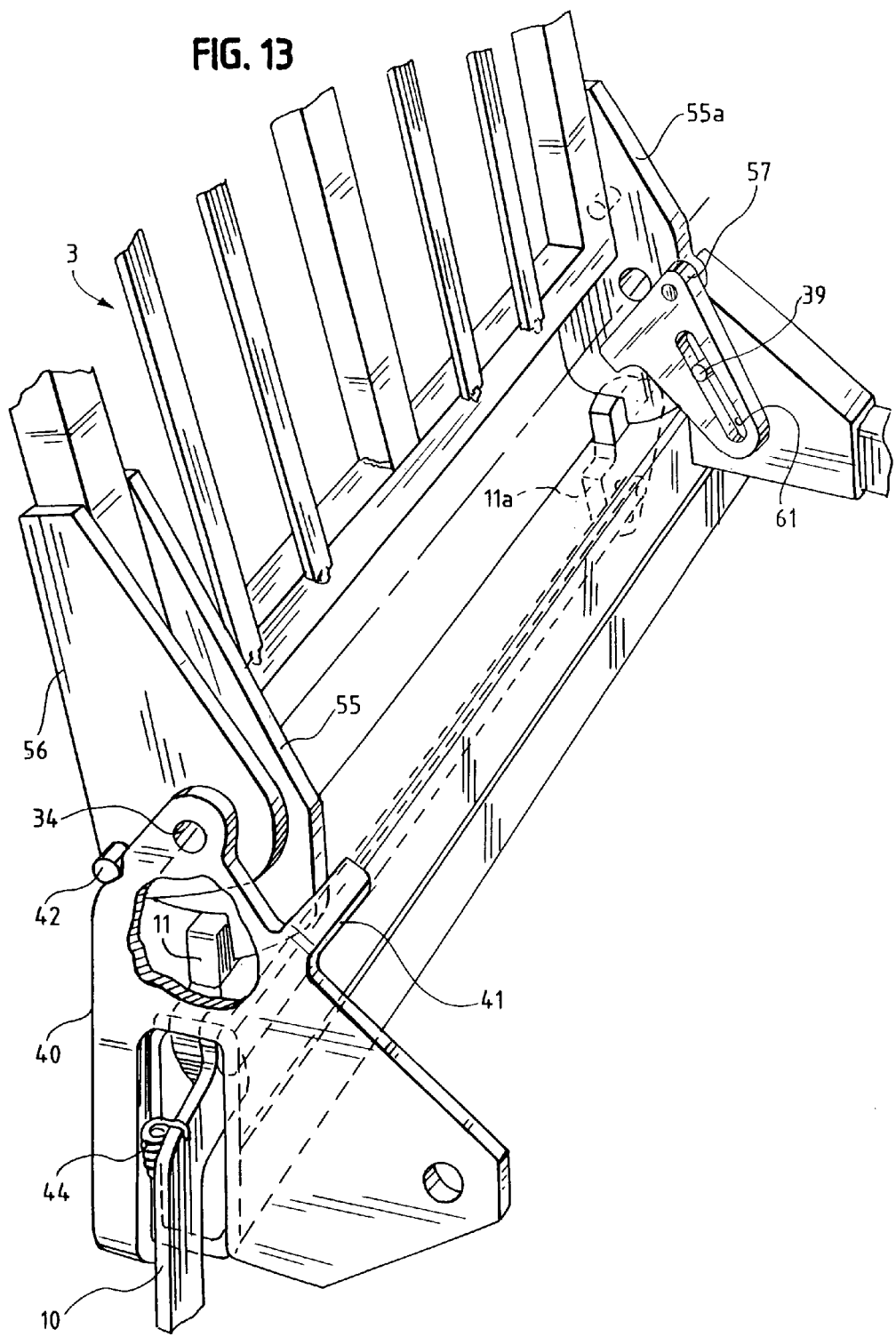
FIG. 13 is a perspective cutaway view from the aisle side of both the aisle and window side dump mechanisms. This figure illustrates both locking plates engaging with the seatback plates.

As in FIG. 13, spring 44 biases spring biased release handle 10 and locking plates 11 and 11a to simultaneously pivot to the locked position. Locking plates 11 and 11a engage swing plate 54 on the aisle side and fasten plate 57 on the window side to restrict seatback 3 from moving upwards to its unfolded position.

To enable seatback 3 to pivot to the folded position, spring biased release handle 10 is pulled by an operator to lower locking plates 11 and 11a to disengage swing plate 54 and fasten plate 57 as shown in FIGS. 12 and 15. Swing plate 54 and fasten plate 57 are no longer restricted by locking plates 11 and 11a; therefore, seatback 3 is enabled to rotate to the folded position. In the folded position, spring biased release handle 10 forces locking plates 11 and 11a to engage with seatback side plates 55 and 55a to hold seatback 3 in its folded position.

Referring to FIG. 4, uplock mechanism 62 keeps the stowable seat in the deployed position. Uplock release handle 69 enables an operator to pivot and release uplock mechanism 62 and enables slide member 60 to travel along runner track 58 to rotate cantilevered stowable seat 76 to the stowed position.

To keep cantilevered stowable seat 76 in the stowed position, downlock mechanism 66 constrains slide member 60 of diagonal truss 4 within runner track 58. Once an operator forces spring biased release handle 10 upward to pivot and release downlock mechanism 66, slide member 60 is released and cantilevered stowable seat 76 may be rotated to the deployed position.

Figure 3:
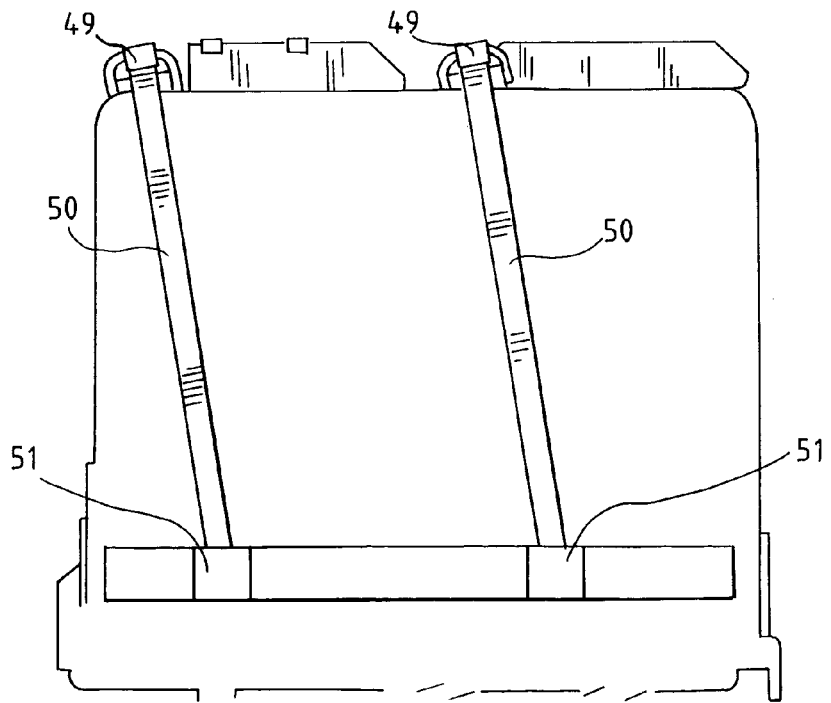
FIG. 3 is a rear view of the stowable seat illustrating the connection of the seatbelt webbing retractor.

As seen in FIGS. 1, 2 and 3, integrated seatbelt assembly 46 includes seatbelt webbing 50, webbing slit 49, webbing retractor 51, clasp 52, buckle 53. Seatbelt buckle 53 receives seatbelt clasp 52, and seatbelt buckle 53 is fixedly attached to the front of webbing retractor 51. Seatbelt webbing 50 has a first end releasably extending from webbing retractor 51 that is securely anchored to the bottom back end of seatback 3. Webbing 50 extends upwardly along seatback 3 and passes through webbing slit 49 at the upper end of seatback 3 and then downwardly along the front surface of seatback 3 to seatbelt clasp 52.

It should be appreciated that the present invention provides a seating system that has an integrated three point safety belt that functions with a stowable seat. In particular, the cantilevered stowable seat employs a dump locking mechanism having specifically designed plates to secure the seatback when there is passenger loading. The three point integrated seatbelt system with improved dump locking mechanism will achieve more safety in vehicles with stowable seats.

The foregoing detailed description of the invention shows how the objects of the present invention have been obtained in a preferred manner. However, other embodiments, modifications, and equivalents of the disclosed concepts such as readily occur to those skilled in the art are intended to be included within the scope of the invention. The above has been offered for illustrative purposes only and is not intended to limit the scope of the invention of this application, which is defined in the claims below:

What we claim is:

1. A cantilevered stowable seat with an integrated seat belt assembly including at least one cantilevered seatbase member, said cantilevered seatbase member pivotally mounted on an axis associated with a seat leg frame producing a free end and an opposing end, located opposite the free end; said seat leg frame fixedly attached to a frame plate adapted to be coupled to a floor of a vehicle; said seatbase member movable through a range of positions between a stowed and a deployed position, wherein said stowed position accommodates an article adjacent to said cantilevered stowable seat, and said deployed position enables passenger seating on said cantilevered seatbase; a seatback being pivotally associated with said cantilevered seatbase, said seatback having an inner frame, and said seatback being movable from a substantially folded position to a substantially unfolded position by way of rotation; whereby said seatback in said folded position rotates with said cantilevered seatbase to said stowed position, and said seatback and said cantilevered seatbase in said stowed position can be rotated concurrently to said deployed position thereafter, the improvement comprising:

a three point integrated seatbelt assembly being associated with said stowable seat to move freely between said stowed and deployed positions and secure a passenger when in said deployed position wherein said seatbelt assembly operatively couples to a dump locking mechanism by transfer of seatbelt loading through said cantilevered seatbase;

a free end dump locking mechanism located on the free end of said cantilevered seatbase member, having a seatback side plate being fixedly attached to said seatback inner frame, a locking plate pivotally associated with the free end of said cantilevered seatbase, whereby said seatback side plate engages said locking plate when in said unfolded position, thereby restraining and stabilizing said seatback from forward movement and distributing forward inertial forces through said seatbase when said passenger is secured by said three point integrated seatbelt assembly, a seatback stop plate fixedly attached to said seatback inner frame and pivotally associated with a bracket plate fixedly attached to the free end of said cantilevered seatbase, a seatback stop pin fixedly attached to said seatback stop plate wherein said seatback stop pin engages said bracket plate when in said unfolded position, thereby restraining said seatback from rearward movement and distributing rearward inertial forces through said seatbase when said passenger is secured by said three point integrated seatbelt assembly, a swing plate pivotally associated with the said bracket plate, a metal stop protrusion fixedly attached to said bracket plate, whereby said swing plate simultaneously engages said metal stop protrusion and said locking plate when in said unfolded position, thereby further restraining said seatback from rearward movement and further distributing rearward inertial forces through said seatbase when said passenger is secured by said three point integrated seatbelt assembly, said swing plate contacting said locking plate to act as a stop for said seatback in said folded position, thereby enabling simultaneous rotation of both said seatback and said seatbase to said stowed position;

an opposite end dump locking mechanism located on the opposing end of said cantilevered seatbase member, having a seatback plate being fixedly attached to said seatback inner frame, a locking plate pivotally associated with the opposing end of said cantilevered seatbase whereby said seatback plate engages said locking plate when in said unfolded position, thereby restraining and stabilizing said seatback from forward movement and distributing forward inertial forces through said seatbase when said passenger is secured by said three point integrated seatbelt assembly, said seatback plate pivotally associated with a bracket plate fixedly attached to the opposing end of said cantilevered seatbase, a seatback stop pin fixedly attached to said seatback plate wherein said seatback stop pin engages said bracket plate when in said unfolded position, thereby restraining said seatback from rearward movement and distributing rearward inertial forces through said seatbase when said passenger is secured by said three point integrated seatbelt assembly, a fasten plate pivotally associated with said seatback plate and slidably associated with said bracket plate, wherein said fasten plate engages said locking plate when said seatback is in said folded position, thereby securing said seatback in said folded position to enable simultaneous rotation of both said seatback and said seatbase to said stowed position; and a metal rod having a first end pivotally associated with a spring biased release handle and said locking plate located on the free end of said cantilever seatbase, said metal rod having a second end pivotally associated to said locking plate located on the opposing end of said cantilever seatbase, wherein said spring biased release handle sustains engagement of said locking plate on the free end of said cantilevered seatbase with said seatback side plate and said locking plate on the opposing end of said cantilevered seatbase with said seatback plate when the seatback is in the unfolded position, wherein pulling said spring biased release handle forces said locking plate on the free end and locking plate on the opposing end to pivot downward into said cantilevered seatbase, thereby enabling said seatback to move to said folded position.

* * * * *